United States Patent
Dalvy et al.

[11] Patent Number: 5,894,680
[45] Date of Patent: Apr. 20, 1999

[54] PROCESS AND DEVICE FOR HEATING A BOOT INTERNAL FITTING

[75] Inventors: Olivier Dalvy, Annecy-le-Vieux; Jean-Philippe Gorliez, Alby-sur-Cheran, both of France

[73] Assignee: Salomon S.A., Metz-Tessy, France

[21] Appl. No.: 08/849,083

[22] PCT Filed: Sep. 23, 1996

[86] PCT No.: PCT/FR96/01480

§ 371 Date: Jun. 2, 1997

§ 102(e) Date: Jun. 2, 1997

[87] PCT Pub. No.: WO97/13447

PCT Pub. Date: Apr. 17, 1997

[30] Foreign Application Priority Data

Oct. 11, 1995 [FR] France ................ 95 12120

[51] Int. Cl.[6] .................................................. F26B 7/00
[52] U.S. Cl. .................................. 34/437; 34/442; 34/104
[58] Field of Search ........................... 34/417, 437, 440, 34/441, 442, 104; 36/2.6, 117.6

[56] References Cited

U.S. PATENT DOCUMENTS

| | | | |
|---|---|---|---|
| 2,446,234 | 8/1948 | Lieber | 34/104 |
| 3,299,529 | 1/1967 | Roberts et al. | 34/104 |
| 4,200,993 | 5/1980 | Blanc et al. | 34/104 |
| 4,787,153 | 11/1988 | Chen | 34/87 |
| 4,964,229 | 10/1990 | Laberge | 36/93 |
| 5,085,289 | 2/1992 | Guindon | 34/104 |

FOREIGN PATENT DOCUMENTS

| | | |
|---|---|---|
| 0004829 | 10/1979 | European Pat. Off. . |
| 2406790 | 5/1979 | France . |
| 2623405 | 12/1977 | Germany . |
| 3421372 | 12/1985 | Germany . |
| 29502189 | 5/1995 | Germany . |
| 2-46876 | 2/1990 | Japan . |
| 2-46896 | 2/1990 | Japan . |
| WO88/06423 | 9/1988 | WIPO . |

*Primary Examiner*—Henry Bennett
*Assistant Examiner*—Steve Gravini
*Attorney, Agent, or Firm*—Greenblum & Bernstein P.L.C.

[57] ABSTRACT

A process and device for heating at least one portion of the internal fitting of a boot, for thermoforming the fitting. The heating of the internal fitting, at a temperature of about 120°–140° C., is done while the fitting is arranged within the boot. The heated air is emitted from an air distribution element, in which each outlet is positioned relative to the internal fitting at least at a minimum predetermined distance. In a preferred embodiment, the device includes an arrangement for positioning a pair of air distribution elements into respective ones of a pair of boots, including respective seats that receive the vamps of the boots, thereby positioning the boots with their heels extending upwardly, and respective abutments that limit the introduction of the air distribution elements within the boots.

23 Claims, 2 Drawing Sheets

PROCESS AND DEVICE FOR HEATING A BOOT INTERNAL FITTING

BACKGROUND OF THE INVENTION

1. Field of the Invention

The present invention relates to a process and a heating device for thermoforming the interior of a boot having a rigid external upper.

2. Description of Background and Relevant Information

Indeed, such boots, for example, ski boots, or mountain boots, ice skate boots, in-line roller skate boots, etc., must comprise an external upper generally constituted by a shell made out of a rigid plastic material, but which could also be made of thick and rigid leather for mountain boots, for example. Such upper must hold the foot-ankle assembly and, in particular, prevent twisting of the ankle and enable a proper transmission of the forces exerted by the foot, either for steering the ski or the gliding board, or for tilting stability when hill-walking.

Such uppers are thus more or less rigid and, therefore, very uncomfortable.

To improve the comfort of such boots, they must comprise an internal fitting generally constituted by a removable liner and made of more flexible materials such as foams.

Such internal fittings are provided to envelop a certain type of foot. Unfortunately, everyone's foot is more or less different from the "standard" foot which led to the construction of the internal fitting. Because the rigid external upper of the boot cannot deform, painful friction points are often created for the user's foot, regardless of the flexibility of the internal fitting.

To remedy these drawbacks, it is known, especially for the ski boot, to make the internal fitting out of a thermoformable material such as polyethylene which, once brought to a temperature of about 120°–140° C., can be configured according to the user's foot and to the external shell, until it perfectly assumes the shape of the user's foot.

Such a process is described, for example, in EP 004 829. This patent teaches to heat the internal fitting, by means of an electrical circuit incorporated therein, after the foot has been positioned inside the boot. Such a process has practically proven unrealistic and very expensive.

Other solutions proposed by JP 246 876, for example, consist of heating the internal fitting after removing it from the boot, either simultaneously from the inside and outside after placing it in an appropriate heating enclosure, or only from the outside, until it reaches the desired uniform thermoforming temperature, on the order of 120°–140° C.

These solutions are not satisfactory either, because they have numerous drawbacks:
  need of providing a cumbersome and costly heating enclosure;
  need of manipulating the internal fitting to remove it and reposition it within the boot;
  risk of burning when manipulating the internal fitting brought beyond 120° C., and when repositioning it within the boot;
  heat loss during these manipulations of the internal fitting which require reheating the fitting;
  risk of inverting the left/right internal fittings when repositioning in the boot;
  length of the process, because only one fitting can be adapted at a time due to the necessary manipulations.

Furthermore, it is neither conceivable to place the boot assembly within the heating enclosure because, on the one hand, the materials constituting the rigid external upper would run the risk of being damaged by the heat and, on the other hand, this external upper would loose its rigidity properties under the effect of such heat, and the thermoforming of the internal fitting would then no longer be justified.

It is also known to use heating apparatuses that are generally constituted by a pipe sending hot air within the ski boots, in order to dry them or reheat them slightly before use. Such apparatuses are not designed for a temperature above 40° and could not be applied directly to a thermoforming of internal fittings at a temperature on the order of 120°–140° C. without risks of damaging the latter.

SUMMARY OF THE INVENTION

Therefore, the object of the present invention is to remedy these disadvantages, and to propose an improved process and device for heating boot internal fittings, which allow for the thermoforming thereof while being compact and inexpensive, as well as easy and quick to implement, without requiring manipulations that are time-consuming, tedious, and capable of causing errors.

This object is achieved by the process for heating at least one portion of the internal fitting of a boot having a rigid external upper according to the invention, due to the fact that it consists of:
  sending hot air, at a temperature comprised between 120° and 140° C., on at least said portion of the fitting arranged within the boot;
  guaranteeing at the same time a predetermined minimum distance between each exit of hot air and said portion of the fitting.
  Indeed, this process enables a very simple and very quick implementation due to the fact that it does not require any manipulation of removing or inserting the internal fitting within the boot. It is further compatible with a fitting fixed inside the boot. Finally, it has been noted, in a manner that is not obvious a priory, that the direct heating of the fitting arranged inside the boot did not run the risk of damaging or softening the rigid external upper of the boot, since the temperature obtained on the outside of this fitting does in fact not exceed 80° C. for a thermoforming temperature on the order of 130° C.

Advantageously, the process also consists of positioning the boot flat and on the wrong side with respect to the hot air distribution system, such that the heat remains trapped within the boot. In this way, the hot air, which still has tendency to rise, remains trapped in the heel/instep zones of the boot which are uppermost due to this position, and a more homogenous and constant temperature is thus obtained in these zones which are precisely the most sensitive zones to be thermoformed.

Of course, if it were advisable to thermoform other zones than those mentioned hereinabove, it is those other zones that would be positioned upward to obtain the maximum of heat therein.

According to a preferred embodiment, the heating device for implementing the process according to the invention comprises:
  at least one hot air distribution nozzle capable of being introduced inside each boot provided with its internal fitting;
  means for positioning the nozzle within the boot.

As a result, the use of this device is very simple since it suffices to slip the boot provided with its fitting on the hot air distribution nozzle, and to turn on the heating, without any additional manipulation.

Advantageously, the means for positioning the nozzle within the boot are constituted by a seat that is capable of receiving the vamp of the boot. The seat thus ensures the positioning of the boot, on the wrong side, i.e., with its zones to be thermoformed located uppermost.

According to a preferred embodiment, the means for positioning the nozzle within the boot also comprise an abutment that limits the introduction thereof inside the boot, and that participates in the positioning of the nozzle within the boot, this abutment further constituting means for blocking the opening of the boot upper between this nozzle and the rear portion of the upper, so as to canalize the hot air on the portion of the instep/tongue of the internal fitting.

The invention will be better understood, and other embodiments thereof will become apparent along the description that follows, with reference to the annexed schematic drawings showing a preferred embodiment, by way of a non-limiting example, and in which.

DETAILED DESCRIPTION OF THE INVENTION

Figure 1:
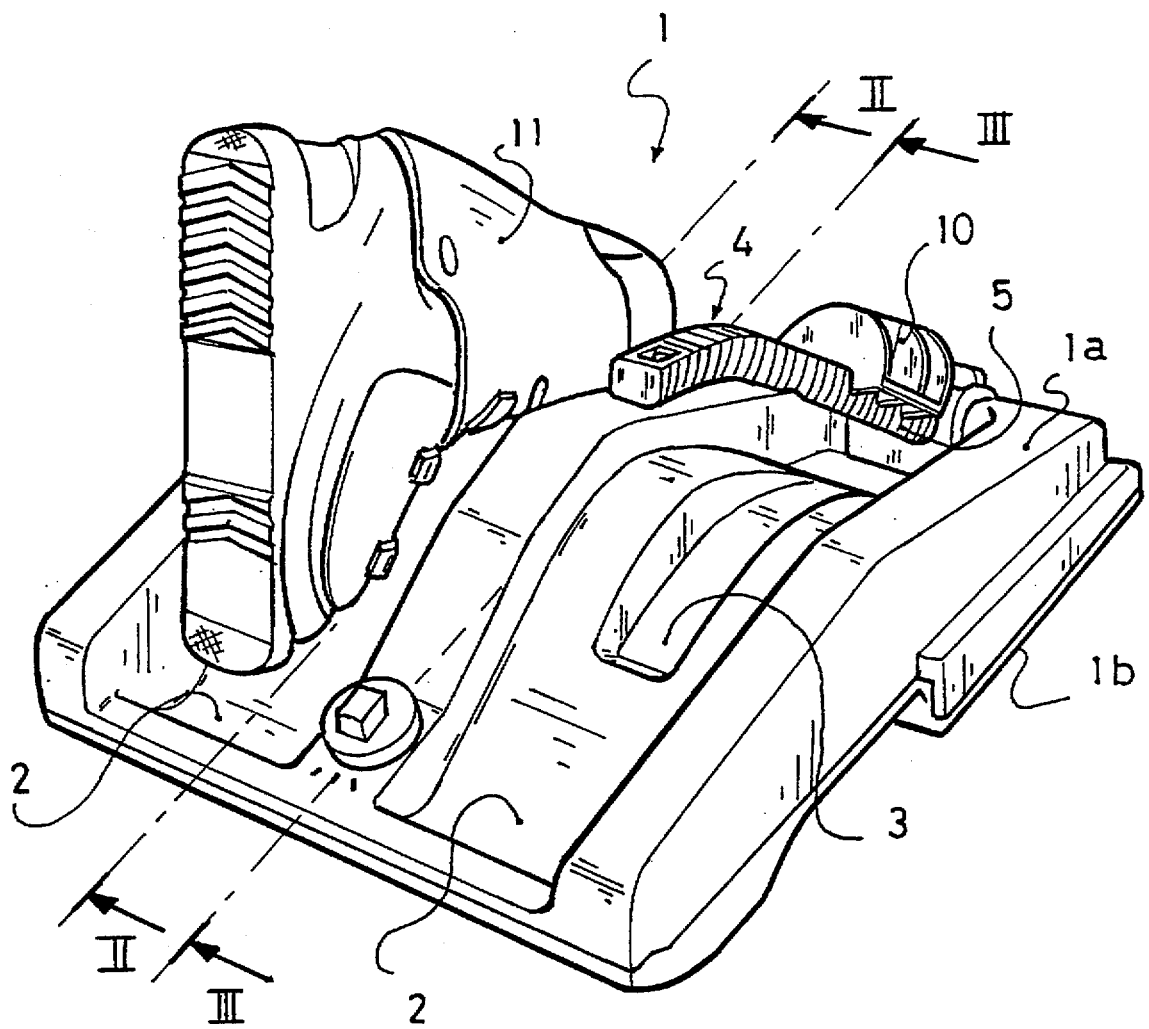
FIG. 1 is a perspective view of a heating device according to the invention, during use with a ski boot.
Figure 2:
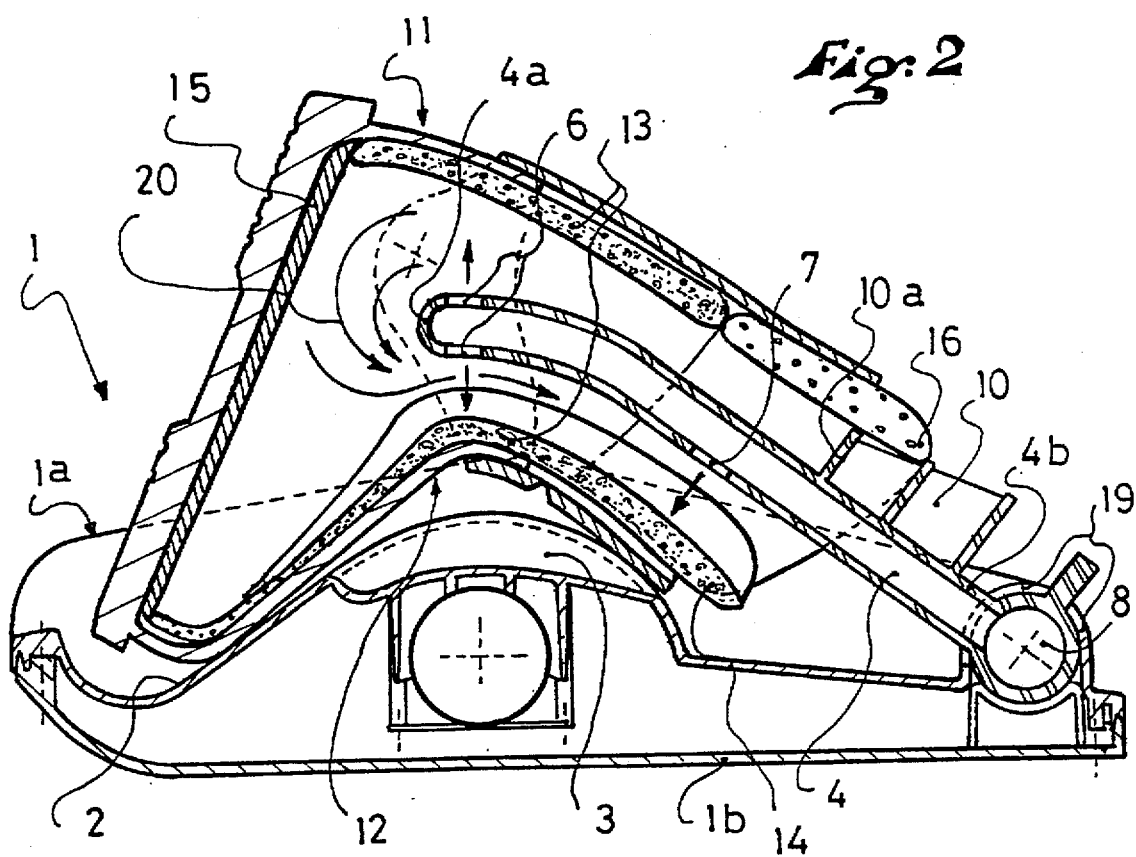
FIG. 2 is a cross-sectional view along II—II of FIG. 1.
Figure 3:
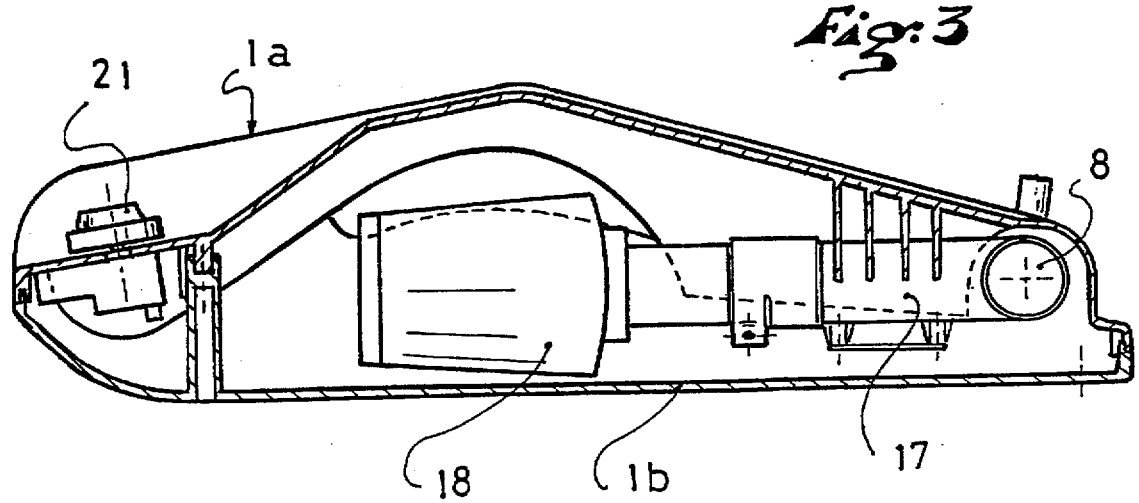
FIG. 3 is a cross-sectional view along III—III of FIG. 1.

The heating device according to the invention of FIGS. 1–3 is shown during use with an alpine ski boots. Of course, it is not limited to such an application, and can be designed and used with any other type of boot having a rigid external upper, which is not necessarily made of plastic material and can be made of a very thick and rigid leather, for example, for a walking/hiking boot, and a fixed or removable, at least partially thermoformable comfort internal fitting.

In the example shown, the heating device 1 has a base having the external aspect of a sort of a fairly flat and substantially parallelepipedic box adapted to be positioned flat on its lower side 1b on a horizontal surface.

This device has, on its upper side 1a, two elongated and curved recesses 2 each adapted to constitute a seat for receiving and supporting a boot 11.

As shown more particularly in FIG. 2, the contour of the seat of each boot is designed so as to provide a stable support to the boot positioned on the wrong side, with the heel upward, the boot in fact being supported on the seat 2 through its vamp 12, i.e., its portion of the top of the foot/instep.

In fact, the contour of the seat 2 corresponds to an average contour of the vamp of the boot as a function of sizes and possibly of the model of the boot. It is important to obtain a stable support for the boot in this inverted position.

Within each seat 2 is also provided a substantially rectangular recess 3 adapted to receive and house each of the heating nozzles 4, or air distribution elements when not in use and for transportation.

Each heating nozzle 4 is constituted by tube that is a slightly curved at its free end 4a to adapt to the inner shape of the boot. Of course, the curvature of this tube can be modified as a function of the type of boot to be thermoformed.

As shown in FIGS. 1 and 2, each nozzle is provided, along its entire length, with external peripheral ribs or grooves 5 adapted to enable, on the outside of the nozzle, a more homogenous diffusion of hot air circulating outside of the nozzle, and also to prevent the risks of burning when holding the nozzle, even when hot air is blown.

These nozzles 4 can have a circular or rectangular section.

As shown more particularly in FIG. 2, each nozzle is closed at its free end 4a, but is provided with at least two diametrically opposed openings 6 in the vicinity of this end.

These openings can be arranged so as to be located opposite the heel and instep portions 13 of the fitting of the boot which are made out of a thermoformable material. They can also be arranged at 90° with respect to the arrangement shown so as to more particularly heat the lateral zones of the boot which are also made of a thermoformable material, and correspond to the malleoli of the foot.

These two arrangements can also be combined.

Further, the closure of the nozzle 4 at its free end 4a is particularly important to prevent a deterioration, by the hot air, of the external sole portion 15 of the fitting, especially when the latter is not made of a thermoformable material, or when the boot is slipped too far on the nozzle 4. Of course, in the case where the internal sole is adapted to be thermoformed, the nozzle would be configured so as to send hot air uniformly on the surface of this internal sole.

Another opening 7 is also provided on each nozzle so as to be located opposite the tongue portion 14 of the fitting of the boot.

With this arrangement of the openings 6 and 7 of each nozzle, air circulation is guaranteed in the heel/instep zone 13 and the tongue zone 14 of the fitting made out of a thermoformable material.

This air circulation is represented by the arrows 20.

Furthermore, each nozzle is connected, at its other end 4b, i.e., its base or lower end to a hot air supply pipe 8.

In the vicinity of this end 4b, each nozzle comprises, at its upper portion, a half cone 10 adapted to cooperate with the upper end 16 of the boot to limit the penetration of said nozzle within the boot.

In the example shown, this half cone 10 is constituted by a series of three half disks 10a each corresponding to the upper half opening of a boot according to extreme and median sizes.

Thus, depending on the size of the boot, its introduction on the nozzle 4 will be limited by one of the disks 10a of the cone coming into abutment against the upper edge of its upper, and the nozzle will thus be prevented from penetrating too deeply inside the boot and deteriorating the latter. The example shown in FIG. 2 corresponds to an average size, the boot being in abutment against the middle disk.

The smallest disk 10a corresponds to a small size, and the largest disk corresponds to a larger size.

Of course, the cone 10 could be obtained in a different manner, it could be replaced by other abutment means constituted, for example, by an upper having an adjustable length, not shown in the drawing, at the free end 4a of the nozzle and cooperating with the bottom 15 of the boot to maintain the desired spacing between the latter and the nozzle 4.

However, the cone 10 also has the additional advantage of closing the upper half opening of the boot, i.e., the opening portion of the boot that is positioned between the rear of this boot and the nozzle, and therefore of preventing hot air from exiting through this opening.

As a result, hot air can only exit through the bottom of this nozzle 4, and a preferred direction of air circulation, represented by the arrows 20, is created in the heel/instep, malleoli zone of the boot and along the tongue 14 of the boot.

Such a construction therefore optimizes the use of hot air, and the quickness and quality of the heating.

The cone 10 also participates in maintaining each boot on its seat 2 and in the correct positioning of the nozzle therein by coming and adapting to the contour of the rear half opening of the boot.

FIG. 2 shows the desired optimum positioning of the nozzle within a boot, i.e., relatively centered with respect to the internal fitting thereof. Possibly, an elastic abutment, such as a blade/spring (non shown in the drawing), could be provided on the lower portion of the nozzle, i.e., opposite the cone 10, to cooperate with the instep/tongue portion of the fitting and perfectly guarantee the desired positioning of the nozzle.

FIG. 3 more particularly shows the hot air supply for each nozzle 4. This supply occurs from a hot air source 18, of a type that is known and not described any further, and produces hot air at a temperature comprised between 120° and 140° C., and preferably at 130° C. This hot air is canalized by a pipe 17 that is connected to the supply pipe 8 of the nozzles 4. A switch 21 positioned on the upper side 1a of the device makes it possible to turn the heating device on and off.

Each of the nozzles 4 is directly mounted on the pipe and communicates with the interior of the latter through an opening 8a.

Furthermore, each nozzle 4 is mounted with a possibility of relative pivoting on the pipe 8, abutments 19 provided on the upper portion 1a of the heating device limiting the pivoting angle of these nozzles.

This pivoting in fact enables a certain clearance of the nozzles in order to facilitate their positioning inside each boot, and their adaptation to the various sizes.

The present invention is not limited to the only embodiment described hereinabove by way of a non-limiting example, but encompasses all of the equivalent embodiments.

One will note that the process and device according to the invention are particularly interesting since they enable a thermoforming of a boot fitting not limited to a removable internal fitting, such as the processes known to date, and therefore can be used for the thermoforming of fixed internal fittings.

The invention will be described in connection with the thermoforming of the heel/instep perimetric zone and on the tongue of an internal fitting, which are the preferred thermoforming zones. Of course, it could be adapted to other thermoforming zones.

We claim:

1. A process of heating at least one portion of an internal fitting of a boot for thermoforming the fitting, the boot having a rigid external upper, the method comprising:

placing the boot on an air distribution element so that the air distribution element projects into the boot, the air distribution element having at least one heated air outlet;

positioning the air distribution element to be spaced from the at least one portion of the internal fitting of the boot by at least a predetermined minimum distance;

sending heated air, having a temperature of substantially 120° C. –140° C., through the at least one heated air outlet, to facilitate thermoforming of the internal fitting.

2. A process according claim 1, wherein:

the air distribution element has a longitudinally extending portion; and said sending of heated air further comprises circulating the heated air longitudinally along the air distribution element between the air distribution element and the at least one portion of the internal fitting of the boot.

3. A process according to claim 1, wherein:

said placing of the boot on the air distribution element comprises placing the boot so that the heel of the boot extends rearwardly and upwardly, thereby trapping air within the boot.

4. A process according to claim 1, wherein:

the internal fitting is positioned within the upper of the boot, the boot further including an internal sole; and said placing of the boot on the air distribution element comprises placing the boot so that the air distribution elements extends within and along the upper of the boot, said air distribution element further comprising a free end facing the internal sole of the boot.

5. A boot thermoforming device comprising:

at least one air distribution element having a size and shape for being positioned within the boot, the air distribution element having at least one heated air outlet;

a structural boot support arrangement to maintain the boot in position, on the air distribution element, so that the air distribution element is spaced from at least one portion of an internal fitting of the boot, along the air distribution element, by at least a predetermined minimum distance; and a source of heated air, to be sent through the at least one heated air outlet, to a temperature of substantially 120° C. –140° C., to facilitate thermoforming of the internal fitting.

6. A boot thermoforming device according to claim 5, wherein:

the air distribution element has a longitudinally extending portion adapted to be positioned within an upper of the boot, and said at least one heated air outlet is adapted to be positioned with respect to the upper of the boot to facilitate circulation of air along the air distribution element and within the internal fitting of the boot.

7. A boot thermoforming device according to claim 5, wherein:

said structural boot support further comprises a seat for receiving and supporting a vamp of the boot.

8. A boot thermoforming device according to claim 5, wherein:

said at least one air distribution element comprises a pair of air distribution elements, one for each of a pair of boots; and said structural boot support further comprises a base having a pair of seats, each of said seats having a shape to receive and support a vamp of a respective one of the pair of boots.

9. A boot thermoforming device according to claim 7, wherein:

said seat has a contour corresponding to a contour of the vamp of a predetermined boot.

10. A boot thermoforming device according to claim 8, wherein:

each of said seats has a contour corresponding to a contour of the vamp of a predetermined boot.

11. A boot thermoforming device according to claim 5, wherein:

said structural boot support arrangement further comprises an abutment to limit insertion of the air distribution element within the boot.

12. A boot thermoforming device according to claim 11, wherein:

said abutment is adjustable depending upon a boot size.

13. A boot thermoforming device according to claim 11, wherein:

each of said at least one air distribution element has a free end and said abutment is positioned at said free end and cooperates with an internal bottom of a boot.

14. A boot thermoforming device according to claim 11, wherein:

said abutment is positioned for engagement with an upper end of the boot.

15. A boot thermoforming device according to claim 5, wherein:

each of said at least one air distribution element has a slightly curved form.

16. A boot thermoforming device according to claim 5, wherein:

said structural boot support further comprises a base;

each of said at least one air distribution element has a base end operatively connected to said source of heated air, each of said at least one air distribution element is pivotally connected to said base.

17. A boot thermoforming device according to claim 5, wherein:

each of said at least one air distribution element has a closed free end; and said at least one heated air outlet comprises at least a pair of diametrically opposed heated air outlets proximate said closed end.

18. A boot thermoforming device according to claim 17, wherein:

said at least one heated air outlet further comprises a heated air outlet positioned to be adapted to emit heated air opposite a tongue of the internal fitting of the boot.

19. A boot thermoforming device according to claim 5, wherein:

said at least one air distribution element has a length, with transverse grooves along an entirety of said length.

20. A boot thermoforming device according to claim 5, wherein:

the boot has an upper opening through which the air distribution element extends; and an abutment is affixed to the air distribution element to block the upper opening between the air distribution element and a rear of the upper.

21. A boot thermoforming device according to claim 5, in combination with the internal fitting of the boot, wherein:

said internal fitting comprises a heel/instep perimetric zone and a tongue; and the entirety said heel/instep perimetric zone and said tongue comprises a thermoformable material.

22. A boot thermoforming device and internal fitting according to claim 21, and further in combination with the boot, wherein:

said internal fitting is removably inserted into said boot.

23. A boot thermoforming device and internal fitting according to claim 21, and further in combination with the boot, wherein:

said internal fitting is fixed in said boot.

* * * * *